US009009003B1

(12) United States Patent
Chan et al.

(10) Patent No.: US 9,009,003 B1
(45) Date of Patent: Apr. 14, 2015

(54) APPARATUS AND METHOD FOR ELIMINATION OF POLARIZATION-INDUCED FADING IN FIBER-OPTIC SENSOR SYSTEM

(75) Inventors: Hon Man Chan, Canyon Country, CA (US); Allen R. Parker, Jr., Lancaster, CA (US)

(73) Assignee: The United States of America as Represented by the Administrator of the National Aeronautics and Space Administration, Washington, DC (US)

( * ) Notice: Subject to any disclaimer, the term of this patent is extended or adjusted under 35 U.S.C. 154(b) by 567 days.

(21) Appl. No.: 13/463,246

(22) Filed: May 3, 2012

(51) Int. Cl.
*G06F 19/00* (2011.01)
*G01D 5/34* (2006.01)
*G01D 5/353* (2006.01)

(52) U.S. Cl.
CPC ............ *G01D 5/344* (2013.01); *G01D 5/35383* (2013.01); *G01D 5/35303* (2013.01)

(58) Field of Classification Search
CPC  G01D 5/344; G01D 5/35383; G01D 5/35303
USPC .............. 702/190, 126; 250/227.19; 356/477, 356/478
See application file for complete search history.

(56) References Cited

U.S. PATENT DOCUMENTS

| | | | |
|---|---|---|---|
| 4,628,493 A | 12/1986 | Nelson et al. | |
| 4,653,915 A | 3/1987 | Frigo et al. | |
| 4,932,783 A | 6/1990 | Kersey et al. | |
| 5,317,384 A | 5/1994 | King | |
| 5,798,521 A | 8/1998 | Froggatt et al. | |
| 5,986,784 A | 11/1999 | Kersey et al. | |
| 6,731,389 B2 | 5/2004 | Luscombe et al. | |
| 6,856,401 B1 | 2/2005 | Ronnekleiv | |
| 7,081,959 B2 | 7/2006 | Waagaard et al. | |
| 7,336,365 B2 | 2/2008 | Waagaard et al. | |
| 7,359,061 B2 | 4/2008 | Waagaard et al. | |
| 7,379,168 B2 | 5/2008 | Froggatt et al. | |
| 7,388,673 B2 | 6/2008 | Froggatt et al. | |
| 7,561,276 B2 | 7/2009 | Boyd | |
| 7,876,644 B2 | 1/2011 | Hall et al. | |
| 2010/0092176 A1 | 4/2010 | Hartog | |

OTHER PUBLICATIONS

Wang Joo Lee, Bong Kyu Kim, Ki Ho Han, and Byoung Yoon Kim, Dual Heterodyne Polarization Diversity Demodulation for Fiber-Optic Interferometers, IEEE Photonics Technology Letters, vol. 11, No. 9, Sep. 1999.

N.J. Frigo, A. Dandridge, and A.B. Tveten, Technique for elimination of polarization fading in fibre interferometers, Electron, Lett. Apr. 12, 1984, vol. 20, Issue 8, p. 319-320.

*Primary Examiner* — John H Le
(74) *Attorney, Agent, or Firm* — Mark Homer (57) ABSTRACT

The invention is an apparatus and method of eliminating polarization-induced fading in interferometric fiber-optic sensor system having a wavelength-swept laser optical signal. The interferometric return signal from the sensor arms are combined and provided to a multi-optical path detector assembly and ultimately to a data acquisition and processing unit by way of a switch that is time synchronized with the laser scan sweep cycle.

15 Claims, 9 Drawing Sheets

FIG. 5C  Channel 1 (-60°)

FIG. 5D  Channel 2 (0°)

FIG. 5E  Channel 3 (+60°)

APPARATUS AND METHOD FOR ELIMINATION OF POLARIZATION-INDUCED FADING IN FIBER-OPTIC SENSOR SYSTEM

STATEMENT OF GOVERNMENT INTEREST

This invention described hereunder was made in the performance of work under a NASA contract, and is subject to the provisions of Public Law #96-517 (35 U.S.C. 202) in which the Contractor has elected not to retain title.

BACKGROUND OF THE INVENTION

1. Field of the Invention

The present invention relates to optical fiber interferometric sensing systems and, more particularly, to an apparatus and method for the elimination of polarization induced fading in such systems.

2. Description of the Background

Stress, strain and fatigue often lead to failure in static and dynamic structural systems. Strain monitoring of such systems can provide an indication of the structural health of the system and predict failures, providing time to alter the system to potentially avoid the failure. Implementation of fiber-optics strain sensors in structural health monitoring is advantageous over traditional strain gauges due to the compactness of fiber optics sensors, the ability to cascade multiple fiber sensors onto a single fiber (as opposed to individual cabling for each strain gauge), and the inherent immunity of optical systems to electromagnetic interference. This technology has been implemented in both and static structures, such as bridges, roads and tunnels, and dynamic structures such as airframes and sea vessels, for real-time health monitoring. A particularly useful feature of fiber optic sensors is that they can provide distributed sensing spanning very large distances.

Optical fibers can be used as sensors to measure strain, temperature, pressure and other quantities by modifying a fiber so that the quantity to be measured modulates the intensity, phase, polarization, wavelength or transit time of light in the fiber. Interferometric fiber optic sensors measure the phase change of light traveling in an optical fiber due to the strains developed in the fiber by an applied pressure. Interferometric fiber optic sensors are extremely sensitive, allowing detection of fiber length variations on the order of a few hundred femtometers.

Several schemes are currently deployed to interrogate distributed optical fiber sensors: including Wavelength Division Multiplexing (WDM), Optical Time Domain Reflectometry (OTDR), and Optical Frequency Domain Reflectometry (OFDR).

WDM multiplexes a number of optical interrogation signals onto a single optical fiber by using different wavelengths (colors) of laser light. Each optical sensor is given a dedicated operating wavelength, and the wavelengths of the gratings are varied so as to be individually distinguished (each reflects a different wavelength of light from a broad-band or swept-wavelength laser source). A demultiplexer at the receiver splits the reflected signals apart for analysis. WDM achieves high spatial resolution but the number of possible sensors able to be deployed is limiting since the wavelength bandwidth is finite, and there is greater complexity in fiber manufacture.

OTDR is based on the premise of sending a pulse of laser light through the fiber and tracking the time at which the reflected signals are detected in order to distinguish the spatial location of each sensor. OTDR is effective for sensing over long distances but suffers from limited spatial resolution. Some schemes combine OTDR and WDM to increase the number of addressable sensors but retain similar limitations.

With OFDR interrogation, a tunable laser wavelength scans a distributed optical system under test. The resulting internal reflections from the optical system interfere with the reflection from a reference reflector, producing a composite modulation of the interferometric signal, where the beat frequencies of the modulation are directly related to the position of the internal reflections. Taking the Fourier transform of the interferometric signal, it is possible to determine the magnitude and position of the internal reflections. OFDR has shown great promise to interrogate hundreds and even thousands of distributed optical fiber sensors.

These fiber optics strain sensors are typically composed of numerous optical fibers, and numerous Fiber Bragg gratings ("FBGs") interposed along the length of each fiber. Each Bragg grating creates a periodic variation of the optical refractive index in the core of the optical fibers and is capable of detecting strain individually through change in its resonant wavelength (i.e., the wavelength at which each grating has its maximum reflectance).

With OFDR all the FBGs are written at the same central wavelength, and their positions along the fiber are detected by measuring the beat frequency of any individual grating's reflection with the reflection from a reference arm of the interferometer having a known length. As the laser wavelength (and therefore frequency) is scanned a small but measurable difference in the time for light to travel from the reference arm and from each grating is observed causing variation in the interference pattern between the signal from the reference arm and the sensor arm, the frequency components of which are linearly related to the distance along the fiber of the grating reflector. This wavelength or frequency domain interference pattern is presented as an "interferogram" (a graph of the variation of the output signal in the wavelength domain which encodes all beat frequencies of the sensor). A Fast Fourier Transform (FFT) signal-processing method is applied to convert the wavelength/frequency domain to the spatial/time domain so that the beating frequency for each FBG encoded within the interferogram can be separated. The Fourier transform of the reflected interferogram gives the signal reflectance as a function of time which, in this case, is equivalent to distance along the fiber. Thus the reflectivity of each grating can be measured. To transform the wavelength (and strain) information of a particular sensor from the spatial domain back to the wavelength domain, a windowing function is first taken to lock-in the desired beating frequency in spatial domain. Then, an inverse Fourier Transform is taken to identify the resonant wavelength of the particular sensor. Since strain information is linearly proportional to the wavelength shift relative to the initial resonant wavelength of the fiber grating, the strain information can be correlated from the wavelength shift information.

Other techniques to decode a particular sensor from the multitude of beat frequency information have been developed. However, regardless of the techniques used to determine the beat frequency, there is an inherent limitation of fiber interferometer sensing technology. Because an interferometric fiber-optic sensor combines the light beams from two optical paths and causes them to interfere to produce an interference pattern that is proportional to the property being sensed, the interference between the light beams from the two paths can fade due to polarization drifts. If the states of polarizations of the two interfering beams from the two arms of the interferometer are co-directional, the interference is at a maximum and the sensitivity of the sensor is greatest. However, if the states of polarizations of the beams from the two arms are orthogonal to each other, the light from the two arms do not interfere and the sensitivity of the sensor is zero. It is well known that the single mode fiber (SMF) used in fiber sensors is a highly bi-refringent optical waveguide and that physical perturbation (such as induced-strain, temperature, or rotation) between the arms of the interferometer can cause changes in the polarization of the waveguide. As a result, random fluctuations in the state of polarization (SOP) of the interfering beams guided in the nominally circular fiber core can lead to fading of the interference signal. This phenomenon is known commonly as polarization-induced fading (PIF).

An inherent solution to eliminate PIF is replacing the highly bi-refringent single-mode fiber with polarization-maintaining fiber (PMF). A PMF does not exhibit any polarization-related intensity change due to physical perturbation, and so the effect of PIF can be eliminated by utilizing PMFs throughout the fiber network. Unfortunately, this approach is not practical because PMFs are significantly more expensive than the SMF-based fiber networks, and so fiber strain sensors based on PMF has not been realized nor commercialized. Other techniques have been proposed to overcome the effect of polarization induced signal fading ranging from the use of polarization controllers in the arms of the fiber interferometer, to polarization input controllers, to polarization diversity detection schemes based on output polarization state selection. In the case of polarization controllers, active controllers such as those based on Faraday rotators or rotatable fiber wave plates can be inserted into one or both of the fiber arms. While this approach is well suited for use in laboratory sensor systems, it is not a practical solution for a deployable sensor and in any event is incompatible with a FBG based system as the gratings already act as reflectors. With respect to changing the source input polarization control, such systems involve additional components such as polarization state controllers to continuously alter the source polarization and may not be a practical solution for systems having thousands of sensors needed to match every single sensors polarization based on feedback from an output detector In the case of polarization diversity detection, fading can be overcome by appropriately selecting a polarization mode at the output of the interferometer. Most polarization diversity detection schemes include three photo-detectors which are 60 degrees apart from one another in terms of their angle of polarization rotation. The advantage of this approach is to ensure that a completely faded signal caused by PIF will not occur. However, because PIF causes each fiber sensor in a multisensory network to experience randomly different degrees of polarization, using polarization diversity detection to selectively choose the best output of the network does not work. Consequently, a more effective apparatus and method for eliminating polarization-induced fading from all sections of the fiber sensor is needed.

SUMMARY OF THE INVENTION

It is, therefore, an object of the present invention to provide an apparatus and method capable of eliminating polarization inducted fading from fiber optic interferometric sensing systems.

It is another object of the present invention to provide an apparatus and method capable of eliminating polarization inducted fading requiring only a single analog-to-digital (A/D) channel for data collection.

It is yet another object of the present invention to provide a system and method that can be retrofitted into existing interferometric sensing systems with minimal disruption.

According to the present invention, the above-described and other objects are accomplished, by an optical fiber interferometric sensing system having a wavelength-swept laser light source providing an optical signal to both a reference arm and a sensing arm having a series of Bragg gratings disposed along its length. The return signals from each arm are combined and provided to a multi-optical path detector assembly and ultimately to a single channel of a data acquisition and processing unit by way of a switch that is time synchronized with the laser scan sweep cycle. In a preferred embodiment, each of three optical paths in the detector assembly is provided with a polarizing element and a photodetector and receives the combined signal from the sensing and reference arms which encodes, in the interference pattern, information regarding the beat frequency of the Bragg gratings encoded in the wavelength domain. On each successive laser sweep cycle the switch advances to the next photodetector and passes the output to a signal processor which converts the wavelength domain signal to the spatial domain and stores the information in a memory buffer. The buffered spatial domain signal from each of the three photodetectors are averaged to generate polarization induced signal fading compensated signal data from which the strain data for a particular Bragg grating on the sensing arm can be obtained by inverse Fourier Transform since there is no loss of overall information in the system. On each subsequent laser sweep cycle the oldest buffered signal data is discarded to make room for newly acquired data in a first-in, first-out buffering scheme.

BRIEF DESCRIPTION OF THE DRAWINGS

Other objects, features, and advantages of the present invention will become more apparent from the following detailed description of the preferred embodiments and certain modifications thereof when taken together with the accompanying drawings in which.

DETAILED DESCRIPTION OF THE PREFERRED EMBODIMENT

For the purposes of promoting an understanding of the principles of the invention, reference will now be made to the exemplary embodiments illustrated in the drawings and described below. The embodiments disclosed are not intended to be exhaustive or limit the invention to the precise form disclosed in the following detailed description. Rather, the embodiments are chosen and described so that others skilled in the art may utilize its teachings. It will be understood that no limitation of the scope of the invention is thereby intended. The invention includes any alterations and modifications in the illustrated device, the methods of operation, and further applications of the principles of the invention which would normally occur to one skilled in the art to which the invention relates. The present invention is an apparatus and method for eliminating polarization induced fading in an interferometric sensor system.

Figure 1:
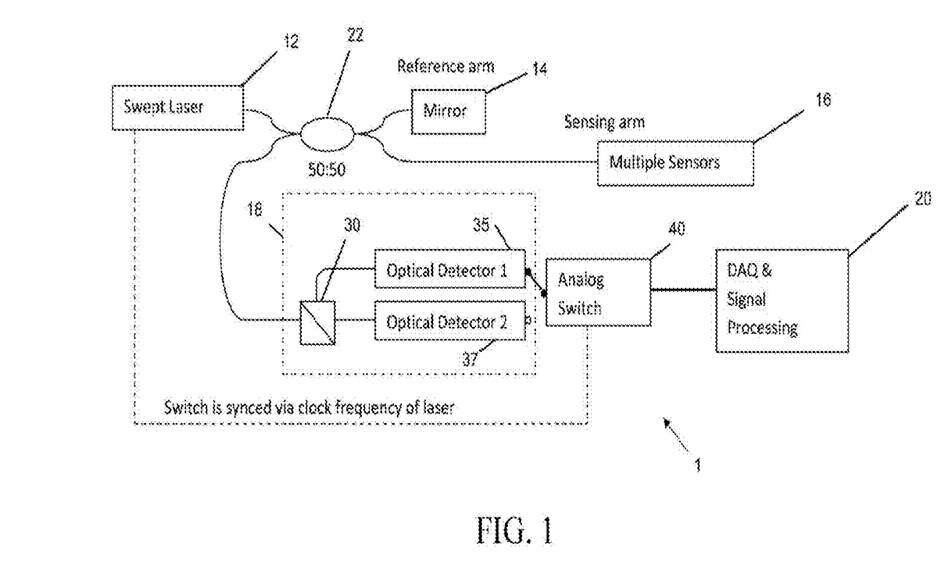
FIG. 1 is a schematic diagram of a two-channel embodiment of the present invention utilizing a polarizing beam splitter and two optical detector elements.
Figure 2:
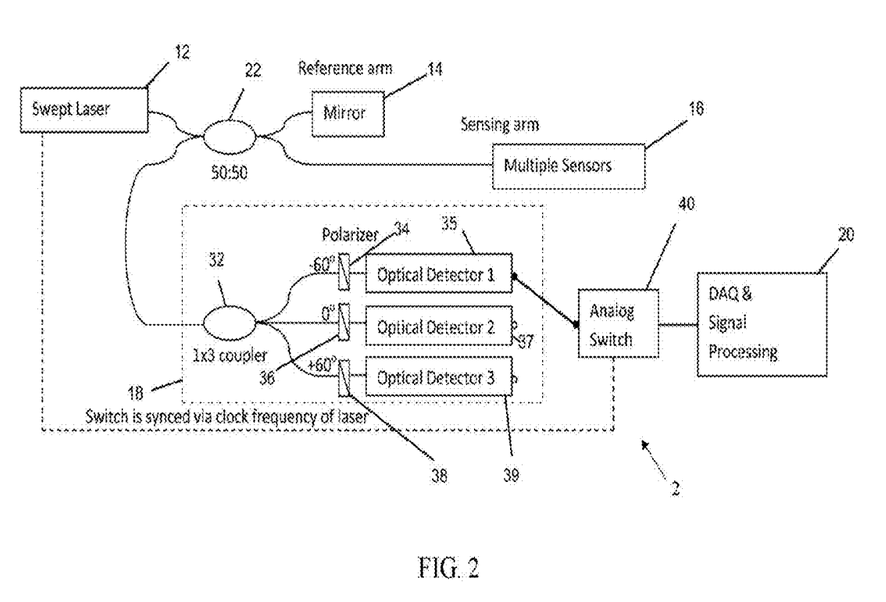
FIG. 2 is a schematic diagram of a three-channel embodiment of the present invention utilizing three optical detector elements, a 1×3 fiber coupler and a polarizer on each branch having a 60 degree angular offset.

FIG. 1 illustrates a two-channel embodiment 1 of the present invention, and FIG. 2 is a three-channel embodiment 2. With reference to both FIGS. 1 and 2, the optical fiber interferometric sensing system 1, 2 in accordance with the present invention has a light source 12, reference arm 14, a sensing arm 16, a detector assembly 18, switch 40 and a data acquisition and processing unit 20. Light source 12 is preferably a swept source laser such as a New Focus TLM-8700 tunable swept laser, with center freq. of 1550 nm, a repetition rate of up to 800 nm/s, and output up to 10 mW. Alternately, a Thorlabs' SL1550-P16 Frequency Swept Tunable Laser or General Photonics WSL-1000 Wavelength-Swept Laser having a center frequency of 1550 nm, a tuning range of 110-180 nm, a repetition rate of 16 kHz, a scan optical output of 10-20 mW may be considered, all having outputs for an optical frequency clock providing instantaneous relative optical frequency marks. The source 20 is connected to both the reference arm 14 and the sensing arm 16 by way of a 50:50 optical coupler 22. Reference arm 14 is terminated in a reflector/mirror 24 and is connected to the detector assembly 18 by way of the coupler 22. Appropriate protection should be provided for laser 12, if necessary, to prevent damage resulting from return signals from the reference and sensor arm through the coupler. Sensing arm 16 is provided with a series of fiber Bragg gratings 26 at regular intervals along its length within the sensing portion of the arm. The sensing portion of the arm is embedded in, affixed to or otherwise integrated with the object the stress of which it is intended to monitor. The sensing arm 16 is also connected to the detector assembly 18 by optical coupler 22 such that the signals from the sensing arm and reference arm are combined prior to entering the detector assembly.

With specific reference to the embodiment having two optical detectors (i.e., a two-channel system) as shown in FIG. 1, the detector assembly 18 includes a broadband beam splitter 30 having a wavelength range cooperatively selected for use with the swept source laser 12. Beam splitter 30 may preferably be a polarizing beam that separates the S and P polarization components of the incoming signal from the coupler 22 and distributes the component signals one each to two optical detectors 35, 37. Alternatively, a non-polarizing beam splitter may be used in conjunction with separate polarizing elements (not shown) as described and depicted in a subsequent embodiment below. The optical detectors 35, 37 are high-speed photo detectors that translate the output signal from optical to electronic, and may preferably be common optical detector such as JDSU ETX 100Rxx InGaAs photodetector series with 1.5 GHz bandwidth and responsivity of 0.75 A/W. The optical detectors 35, 37 are connected to the data acquisition and processing unit 20 on a single input channel by way of an analog switch 40. Analog switch 40 is clock-synchronized with the scan cycle of swept laser 20 so as to sequentially switch between the output of the two detectors 35, 37 on successive scan cycles as will be described below. The data acquisition and processing unit 20 preferably combines a conventional data acquisition system (DAS or DAQ) capable of converting the analog electrical waveforms into digital values for processing, and a controller for processing the result. The components of the data acquisition system may include signal conditioning circuitry to filter or amplify the sensor signals, and an analog-to-digital (A/D) converter for converting conditioned sensor signals to digital values. The controller may comprise any general purpose computer or programmable microcontroller such as having a processor, memory and at least one input channel coupled to the A/D converter. In certain embodiments one or more controller or field programmable gated array (FPGA) may be implemented to perform certain functions such as FFT/iFFT calculations.

With reference to FIG. 2, a three-channel embodiment of the optical fiber interferometric sensing system 2 according to the present invention is depicted. The three-channel embodiment is also provided with a light source 12, reference arm 14, a sensing arm 16, a detector assembly 18 and a data acquisition unit 20 as with the two-channel system of FIG. 1. However, the system of FIG. 2 is provided with a three-channel detector system 18 in which the polarizing beam splitter 30 is replaced with a 1×3 non-polarizing broadband optical coupler 32 and a series of polarizers 34, 36, 38, one each in combination with optical detectors 35, 37, 39. In a preferred embodiment the optical axes of the three polarizers are 34, 36, 38 oriented at 60° relative to one another. The optical detectors 35, 37, 39 are again connected to the data acquisition unit 20 on a single input channel by way of an analog switch 40. Here, analog switch 40 is clock synchronized with the scan cycle of swept laser 12 so as to sequentially cycle between the output of the three detectors 35, 37, 39 on successive scan cycles as will also be described below. The data acquisition unit 20 is again preferably a general purpose computer or programmable microcontroller as described above.

Figure 3A:
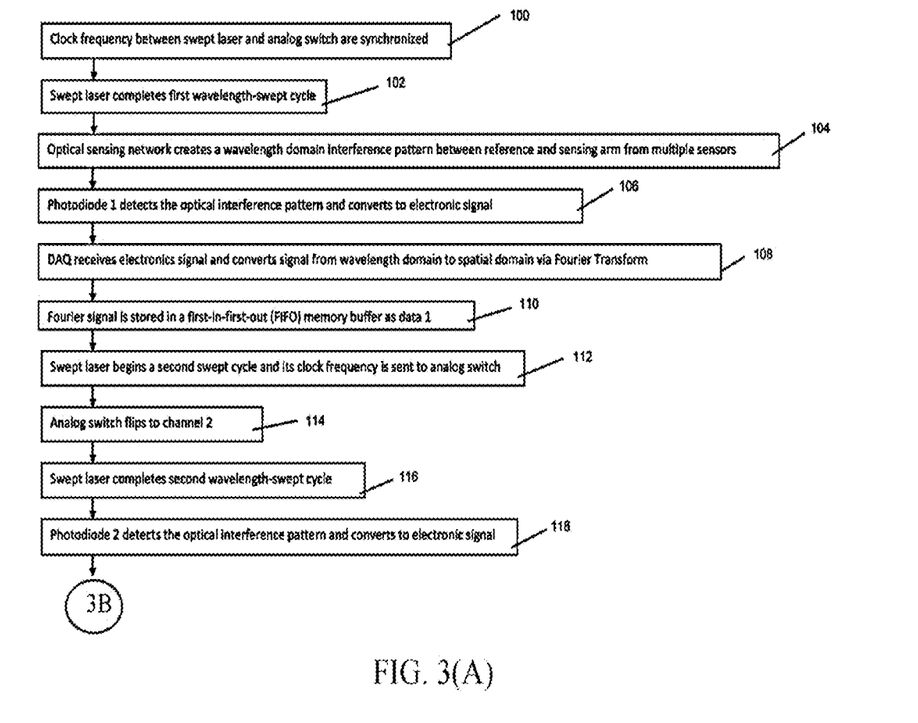
FIG. 3 is flow diagram of the steps of a three-channel PIF compensation scheme.
Figure 3B:
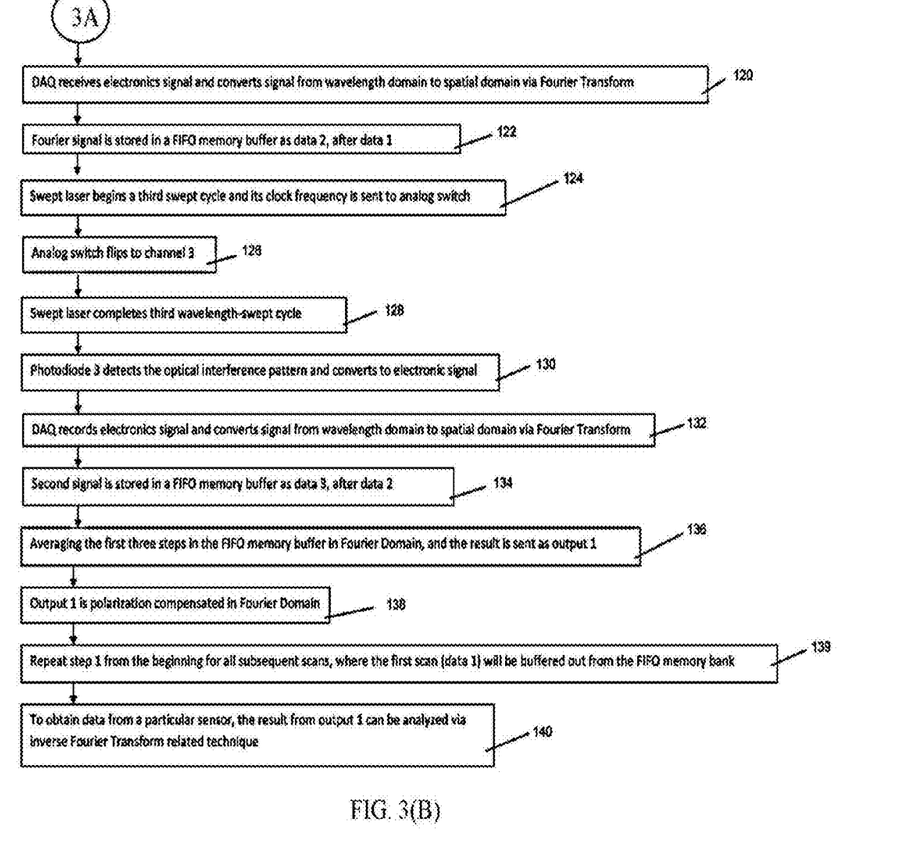
Figure 4:
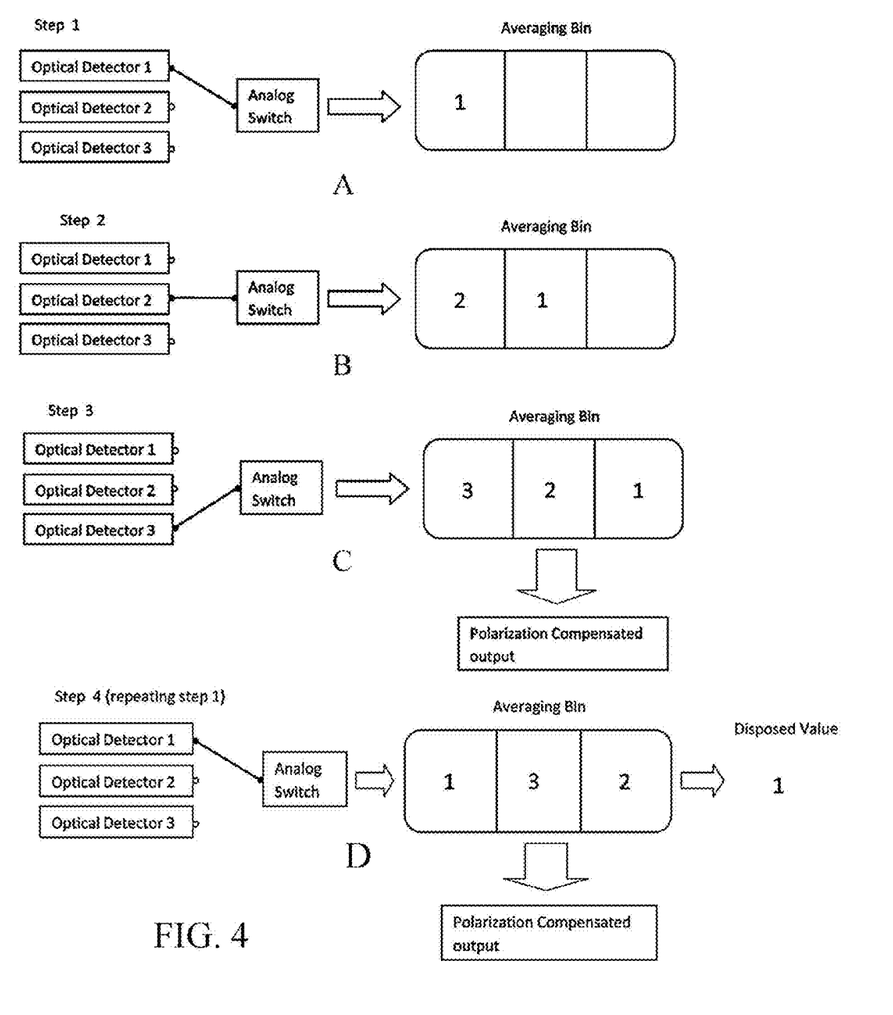
FIG. 4A through 4D are diagrams of the steps of a first-in, first-out PIF compensation scheme.

With reference to FIG. 3, the present approach to mitigating polarization-induced fading (PIF) in multiple cascaded fiber sensors using diversity detection by equally combining all signals in the Fourier (frequency or wavelength) domain is herein described in the context of the three channel optical fiber interferometric sensing system 2 of FIG. 2. On initialization of the sensing system, at step 100, the clock frequency of the swept laser 12 is synchronized with the analog switch 40 and the switch is set to the first analog data channel to pass the electrical output of optical detector 35 to the data acquisition unit 20. At step 102, the swept laser completes a first wavelength swept cycle of the optical sensing network and, at step 104, the optical sensing network creates a wavelength domain interference pattern between the reference arm 14 and the sensing arm 16 in which the x-axis represents the wavelength domain and the y-axis represents the amplitude of the beating interference. The wavelength domain interference pattern contains information regarding the beat frequency of all gratings on the sensing arm 16. The coupler 32 distributes the signal equally to all polarizers 34, 36, 38 without regard to polarimetry of the signal. At step 106, after passing through the polarizers 34, 36, 38 the amplitude of the interference pattern of the optical signal is sensed by the photodiodes of the optical detectors 35, 37, 39 and converted to an electrical signal. The electrical signal from the first optical detector 35 is passed to the data acquisition unit 20 which converts the analog signal to digital and converts the signal from the wavelength domain to the spatial domain using a Fourier Transform, where the x-axis now represents the relative distance along the interfering arms and y-axis represents the amplitude (signal strength) of the reflection from each Bragg grating. At step 110 the data acquisition system 20 stores the Fourier signal in a first buffer position in memory, as depicted in FIG. 4A. The electronic signals from the second and third optical detectors 37, 39 are discarded.

At step 112, the swept laser 12 begins a second sweep cycle of the optical network and the analog switch 40 is set, at step 114, to the second analog data channel in synchronization with a signal indicative of the laser clock cycle. At step 116, the laser 12 completes the second wavelength swept cycle and the wavelength domain interference pattern from the optical sensing network is again distributed to all three polarizers 34, 36, 38 by coupler 32 without regard to signal polarimetry. At step 118, after passing through the polarizers 34, 36, 38, the amplitude of the interference pattern of the optical signal is sensed by the photodiodes of the optical detectors 35, 37, 39 and converted to an electrical signal. The electrical signal from the second optical detector 37 is passed to the data acquisition 20 via switch 40 and the signals from the first and third photodiodes 35, 39 are discarded. At step 120, the data acquisition system 20 converts the analog signal to a digital signal and converts the digital signal from the wavelength domain to the spatial domain using a Fourier Transform. At step 122, the data acquisition system 20 stores the Fourier signal in a second buffer position in memory, as depicted in FIG. 4B.

At step 124, the swept laser 12 begins a third sweep cycle and the analog switch 40 is set, at step 126, to the third analog data channel in synchronization with a signal indicative of the laser clock cycle. At step 128, the laser 12 completes the second wavelength swept cycle and the wavelength domain interference pattern from the optical sensing network is again distributed to all three polarizers 34, 36, 38 by coupler 32 without regard to signal polarimetry. At step 130, after passing through the polarizers 34, 36, 38 the amplitude of the interference pattern of the optical signal is sensed by the photodiodes of the optical detectors 35, 37, 39 and converted to an electrical signal. The electrical signal from the third optical detector 39 is passed to the data acquisition unit 20 via switch 40 and the signals from the first and second photodiodes 35, 37 are discarded. At step 132, the data acquisition system 20 converts the analog signal to digital and converts the digital signal from the wavelength domain to the spatial domain using a Fourier Transform. At step 134, the data acquisition unit 20 stores the Fourier signal in a third buffer position in memory, as depicted in FIG. 4C.

At step 136, the data acquisition system averages the first, second and third buffered signals in the Fourier Domain and, at step 138, outputs the averaged signal as polarization compensated signal in the Fourier Domain. By averaging all channels in the spatial domain, all of the spatial relation for all channels of the diversity detectors can be retained, thereby compensating for signal loss at each channel stemming from PIF-related losses. At step 140, the strain data for a particular Bragg grating on the sensing arm 16 can be obtained from the polarization compensated signal through analysis by an inverse Fourier Transform related technique since there is no loss of overall information in the system. At step 139, the analog switch 40 is again set to the first analog data channel in synchronization with the laser clock cycle and the wavelength swept cycle is repeated as at step 102. As seen in FIG. 4D, the Fourier signal stored in the first buffer position at step 110 is discarded and replaced by the newly received Fourier signal from channel 1/optical detector 35, at which point the data acquisition system 20 generates a new average of the buffered Fourier Domain signals and outputs it as a new polarization compensated output. The cyclic, synchronized network interrogation repeats for the duration of the testing/monitoring period with the switch 40 continuously cycling through detector positions in a round-robin fashion. Similarly, on each new interrogation, the oldest buffered signal is discarded in favor of the newly acquired signal in a first-in, first-out (FIFO) buffering process.

Figure 5A:
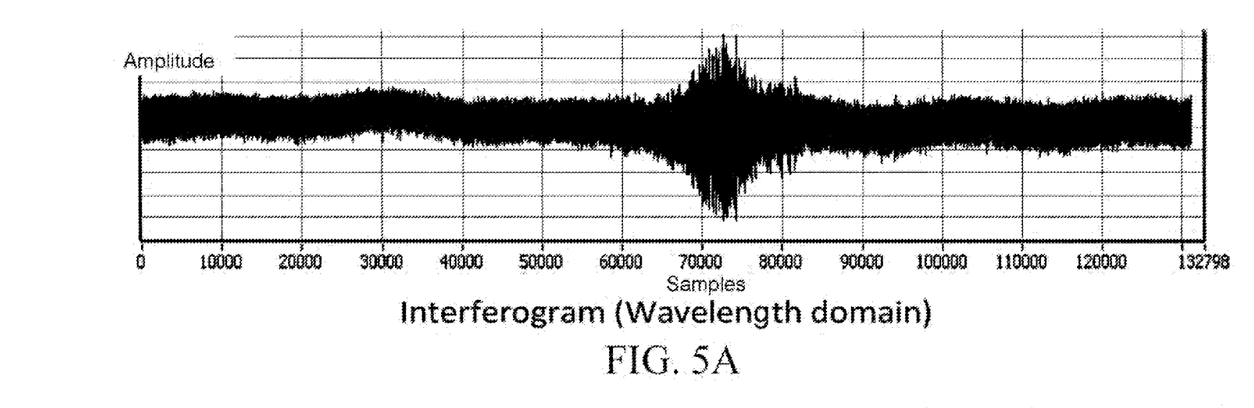
FIG. 5A is a graph illustrating the interferogram generated by a three channel optical sensing network according to the present invention over a single wavelength swept cycle of the laser.
Figure 5B:
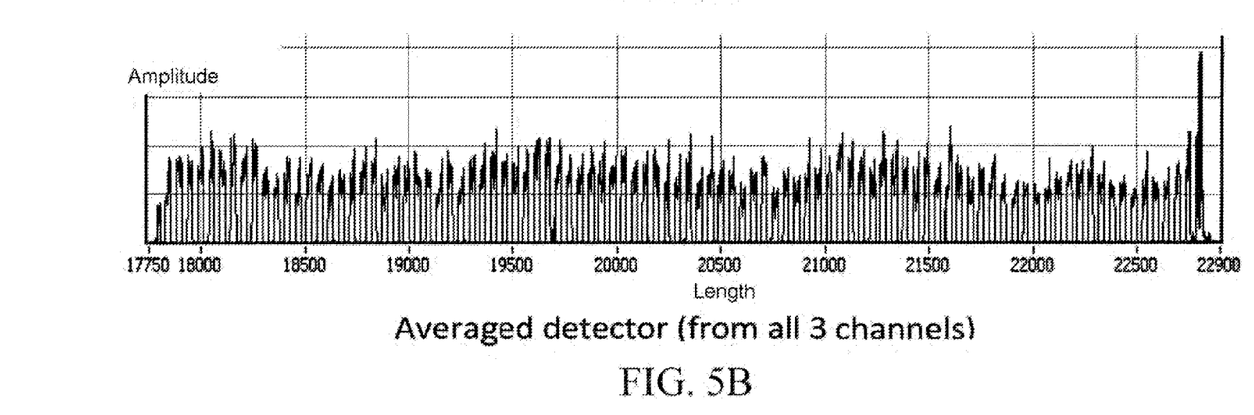
FIG. 5B is a graph illustrating the combined averaged of the spatial domain signals from the three channels.
Figure 5C:
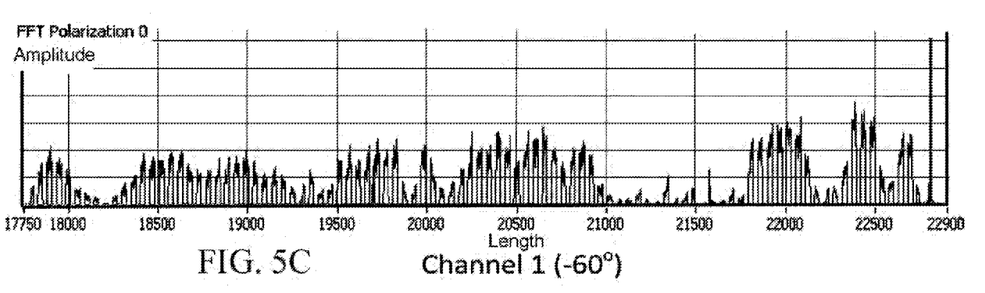
FIG. 5C is a graph illustrating the output from the first photodetector depicted in the spatial domain.
Figure 5D:
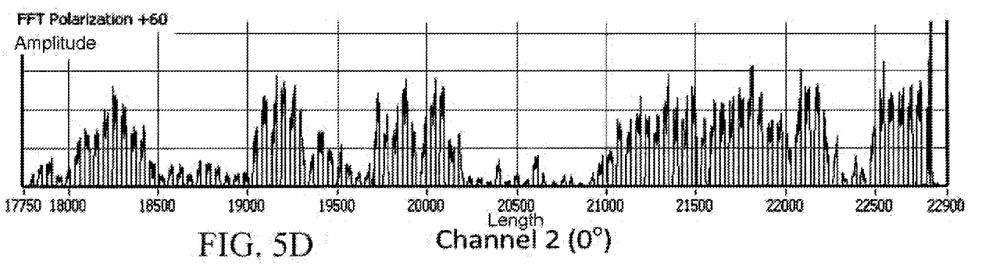
FIG. 5D is a graph illustrating the output from the second photodetector depicted in the spatial domain for which the plane of polarization of the polarizing element has been rotated 60 degrees relative to that of the first photodetector.
Figure 5E:
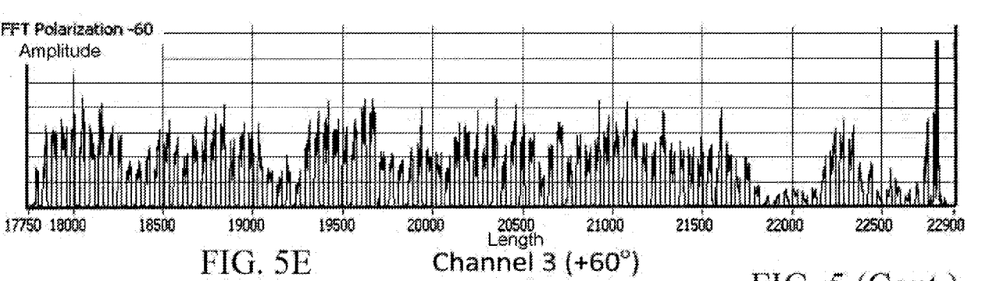
FIG. 5E is a graph illustrating the output from the third photodetector depicted in the spatial domain for which the plane of polarization of the respective polarizing element has been rotated 120 degrees relative to that of the first photodetector.
Figure 6A:
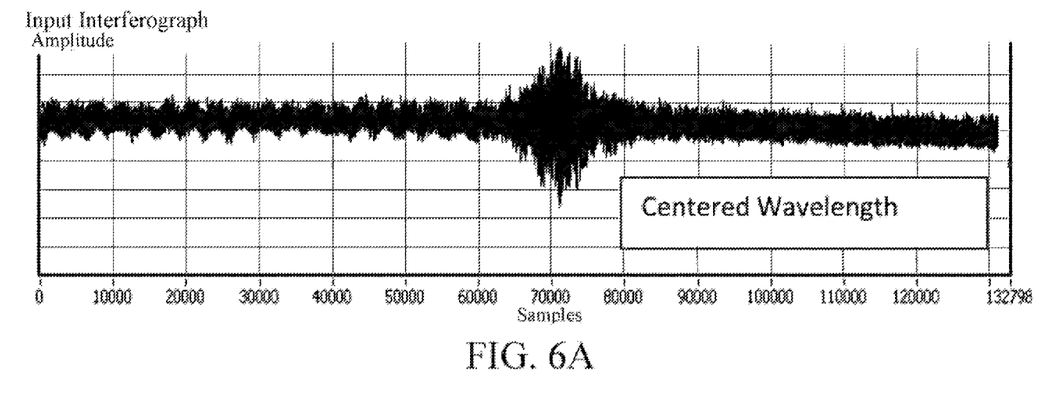
FIG. 6A is a graph illustrating the interferogram generated by a two channel optical sensing network according to the present invention over a single wavelength swept cycle of the laser.
Figure 6B:
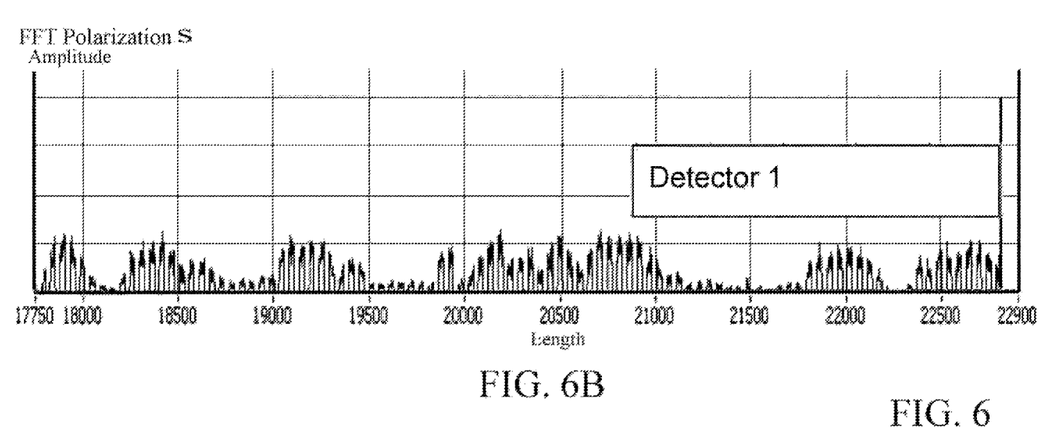
FIG. 6B is a graph illustrating the combined averaged of the spatial domain signals from the two channels.
Figure 6C:
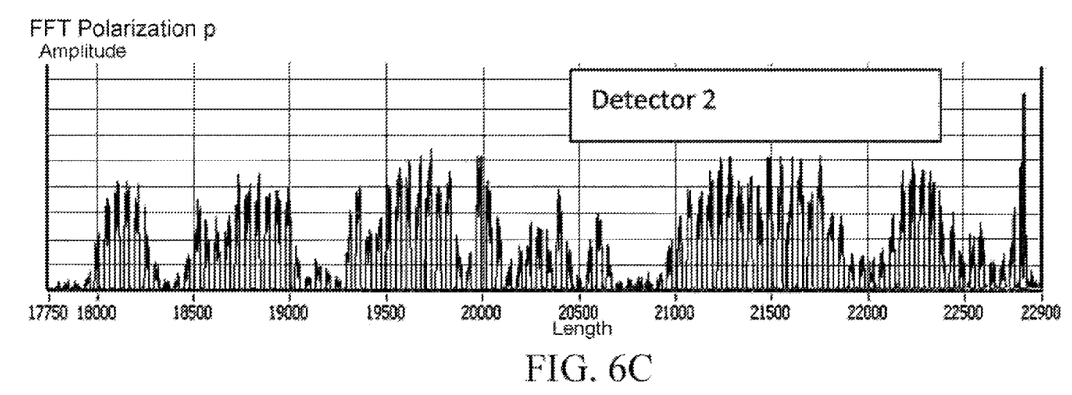
FIG. 6C is a graph illustrating the output from the first photodetector depicted in the spatial domain.
Figure 6D:
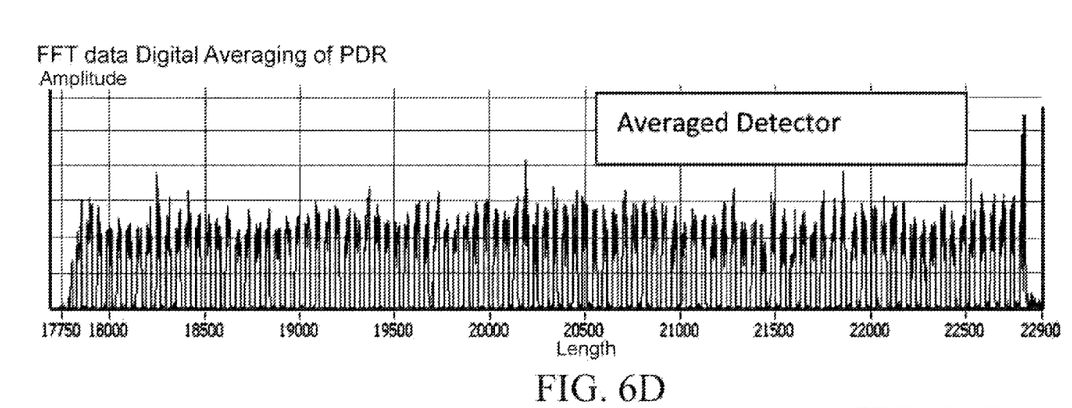
FIG. 6D is a graph illustrating the output from the second photodetector depicted in the spatial domain for which the plane of polarization is orthogonal to that of the first photodetector.

With reference to FIGS. 5A-5E, the interferogram generated by the optical sensing network over a single wavelength swept cycle of the laser 12 is depicted in FIG. 5A. In FIG. 5C the output from the first photodetector is depicted in the spatial domain. Observe that portions of the signal have significantly reduced signal amplitude due at least in part to fading as a result of a polarization mismatch between the sensing and reference signals. FIG. 5D and FIG. 5E depict the digitized output from the second the third photodiodes in the spatial domain for which the plane of polarization of the respective polarizing elements have been rotated 60 and 120 degrees, respectively. Here again, portions of the signal are degraded by polarization induced fading. FIG. 5B, however, depicts the combined averaged of the signals from the three channels in which polarization induced fading is greatly minimized or eliminated. Note that while a three channel system is depicted in FIG. 5, a greater or lesser number of channels may be utilized in practice such as, for example, a four channel system or the two channel system described above, the output of which is depicted in FIGS. 6A-6D.

In an alternate embodiment of the invention. A three-channel diversity detector is considered in which the detector 18 comprises only a single optical path and a single optical detector. Also eliminated is the analog switch 40 although the signal processing steps remain unchanged. In this embodiment the polarizing element before the optical detector is provided with a variable axes of polarization such as for example by rotating a polarizing filter. The rate of rotation of the filter is synchronized with the clock frequency of the swept laser such that the axes of rotation preferably turns, in this three channel embodiment, 60 degrees with each laser interrogation cycle. On each scan cycle the optical sensing network creates a wavelength domain interference pattern between the reference arm and the sensing arm in which the x-axis represents the wavelength domain and the y-axis represents the amplitude of the beating interference. The amplitude of the interference pattern of the optical signal is sensed by the photodiode of the optical detector and converted to an electrical signal which is passed directly to the data acquisition unit 20 which converts the analog signal to digital and converts the signal from the wavelength domain to the spatial domain using a Fourier Transform where, where the x-axis now represents the relative distance along the interfering arms and y-axis represents the amplitude (signal strength) of the reflection from each Bragg grating. The data acquisition unit 20 stores the Fourier signals sequentially in a buffer according to the FIFO scheme previously described and averages the buffered signals after each successive scan to produce PIF compensated data.

Having now fully set forth the preferred embodiment and certain modifications of the concept underlying the present invention, various other embodiments as well as certain variations and modifications of the embodiments herein shown and described will obviously occur to those skilled in the art upon becoming familiar with said underlying concept. It is to be understood, therefore, that the invention may be practiced otherwise than as specifically set forth in the appended claims.

What is claimed:

1. An assembly for reducing or elimination polarization inducted fading in an optical interferometric sensing network, comprising:
   an optical source for introducing an optical signal into said network;
   a reference optical path and a sensing optical path each connected at an input to said optical source for transmitting said optical signal, said sensing optical path comprising at least one Bragg grating;
   a coupler for combining an optical signal from said reference optical path and an optical signal from said sensing optical path;
   a detector for converting said combined optical signal into at least one electrical signal, said detector further comprising
      a first optical path comprising a first polarizer and a first optical detector;
      a second optical path comprising a second polarizer and a second optical detector, said first optical detector for generating a first electrical signal on receipt of said combined optical signal and said second optical detector for generating a second electrical signal on receipt of said combined optical signal; and
      a coupler for dividing said combined optical signal between at least said first optical path and said second optical path;
   a switch for selectively connecting at least said first electrical signal or said second electrical signal to a signal acquisition and processing unit;
   a signal acquisition and processing unit electrically connected to said switch, said acquisition and processing unit comprising an analog-to-digital signal converter, a digital processor and digital memory; and
   a timing control signal generator for synchronizing a position of said switch with said introduction of said optical signal by said optical source.

2. The assembly of claim 1, wherein said optical source is a swept source laser.

3. The assembly of claim 1, wherein said coupler for dividing said combined optical signal is beam splitter.

4. The assembly of claim 3, wherein said beam splitter is a polarizing beam splitter.

5. The assembly of claim 1, wherein said coupler for dividing said combined optical signal is 1×3 coupler and said least at least a first optical path and a second optical path further comprises a third optical path, said third optical path comprising a third polarizer and a third optical detector; and
   wherein said switch is disposed to selectively connect said first electrical signal, said second electrical signal or a third electrical signal from said third optical detector to said signal acquisition and processing unit.

6. The assembly of claim 1, wherein said first, second and third polarizers are oriented such that their axes of polarization are spaced at 60 degree intervals.

7. The assembly of claim 1, wherein said electrical signal of said first optical detector or said second optical detector encodes an interference pattern between said optical signal from said reference path and an optical signal from said sensing path in the wavelength domain.

8. The assembly of claim 7, wherein said processor is configured to convert said encoded interference pattern from said wavelength domain to a spatial domain prior to storing said interference pattern in said memory.

9. A method of reducing or eliminating polarization induced signal fading in an optical interferometric sensing network comprising the steps of:
   inputting a timing control signal into a reference optical path and a sensing optical path, the sensing optical path comprising at least one Bragg grating;
   inputting an optical signal into said reference optical path and said sensing optical path in synchronization with said timing control signal to obtain an optical return signal from each path;
   combining the optical return signals via a coupler into a combined optical return signal path;
   dividing the combined optical return signal into a first combined optical return signal and second combined optical return signal via a coupler;
   converting the first combined optical return signal into a first electrical signal by inputting the combined optical return signal into a first optical path comprising a first polarizer and a first optical detector;
   converting the second combined optical return signal into a second electrical signal by inputting the combined optical return signal into a second optical path comprising a second polarizer and a second optical detector;
   selectively transmitting the first and second electrical signal in series to a signal acquisition and processing unit via a switch between the optical detectors and the signal acquisition and processing unit in accordance with said timing control signal.

10. The method of claim 9 wherein the dividing step includes a third combined optical return signal which is converted into a third electrical signal by inputting the third combined optical return signal into a third polarizer and a third optical detector; and wherein said first electrical signal, said second electrical signal and said third electrical signal are selectively transmitted to said signal acquisition and processing unit in series.

11. The method of claim 10 further comprising the steps of in said signal acquisition and processing unit, converting from a wavelength domain to a spatial domain each serially received electrical signal;
   storing, in a memory having a number of buffer positions equal to the number of optical detectors, each converted electrical signal in a discrete buffer position; and
   when all of said buffer positions are full, averaging the stored, converted electrical signals in the spatial domain to reduce or eliminate the effect of polarization induced fading, and discarding the oldest stored converted electrical signal in favor of a newly received converted electrical signal.

12. The method of claim 10 wherein said step of inputting an optical signal comprises the sub-step of sweeping the wavelength of said optical signal across a predetermined range.

13. A method of reducing or eliminating polarization induced signal fading in an optical interferometric sensing network comprising a reference arm and a sensor arm, said sensor arm having at least one Bragg grating; at least two photodetectors each coupled with a polarizing element; a data acquisition and processing unit, and a switch, said data acquisition and processing unit connected to said at least two photodetectors via said switch; comprising the steps of:

inputting a time signal into the reference arm and sensor arm;

cyclically interrogating said reference arm and said sensor arm with an optical signal in accordance with said time signal to obtain a return optical signal from said reference arm and said sensor arm;

combining the return optical signal from said reference arm and the return optical signal from said sensing arm to obtain a combined optical signal;

inputting said combined optical signal to said at least two photodetectors via said polarizing elements, said photodetectors each generating an electrical signal indicative of an interference pattern in said combined optical signal;

selectively inputting one of the electrical signals generated by said at least two photodetectors to said data acquisition and processing unit via said switch, said switch being configured to serially transmit the signal of each of said at least two photodetectors to said data acquisition and processing unit in accordance with said time signal.

14. The method of claim 13 wherein said data acquisition and processing unit comprises a processor and memory, said memory having a predefined number of buffer positions, wherein said method further comprises the steps of:

in said data acquisition and processing unit,
converting a first received of said serially transmitted electrical signals from a wavelength domain to a spatial domain by said processor;
storing said first received spatial domain signal in a first buffer position of said memory;
converting each of said serially transmitted electrical signals subsequently received from a wavelength domain to a spatial domain by said processor;
storing each of said subsequently received spatial domain signals in a buffer position of said memory;
when all of said predefined buffer positions are filled, averaging all of said spatial domain signals;
outputting said averaged spatial domain signal as a polarization induced signal fading compensated signal, and
discarding the oldest stored spatial domain signal from its buffer position so as to free said buffer position for a next subsequently received spatial domain signals.

15. The method of claim 14 wherein said converting steps are performed by Fourier Transformation in said processor.

* * * * *